June 12, 1923.
P. GOLDSBOROUGH
PILLAR POST STRUCTURE FOR BATTERIES
Filed March 19, 1921
1,458,757
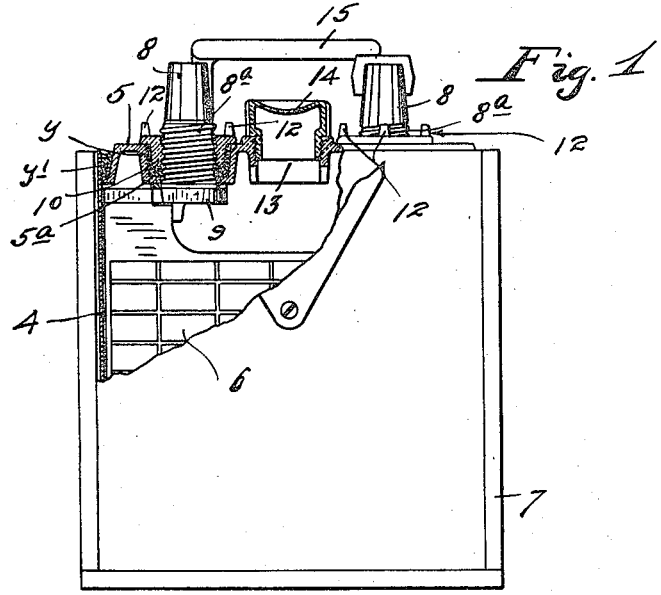
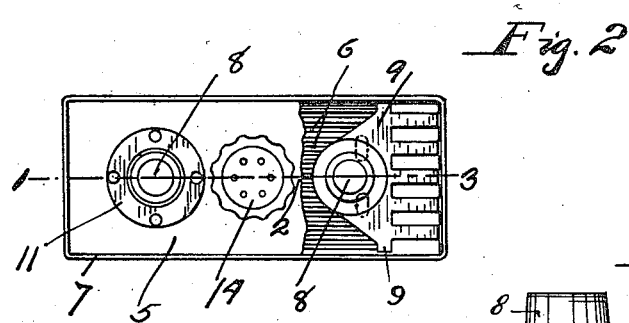
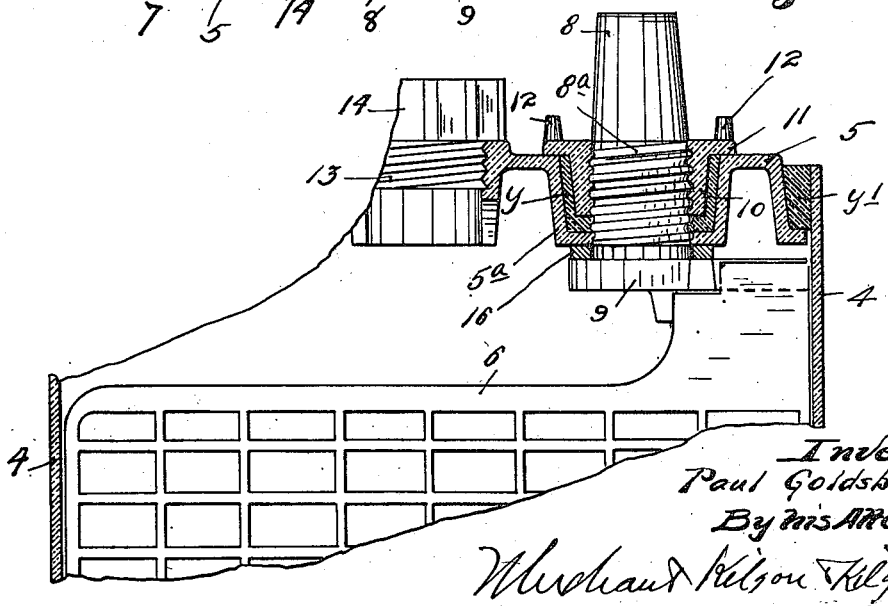
Inventor
Paul Goldsborough
By his Attorneys Patented June 12, 1923.

1,458,757

UNITED STATES PATENT OFFICE.

PAUL GOLDSBOROUGH, OF MINNEAPOLIS, MINNESOTA.

PILLAR-POST STRUCTURE FOR BATTERIES.

Application filed March 19, 1921. Serial No. 453,549.

*To all whom it may concern:*

Be it known that I, PAUL GOLDSBOROUGH, a citizen of the United States, residing at Minneapolis, in the county of Hennepin and State of Minnesota, have invented certain new and useful Improvements in Pillar-Post Structures for Batteries; and I do hereby declare the following to be a full, clear, and exact description of the invention, such as will enable others skilled in the art to which it appertains to make and use the same.

My invention relates particularly to storage batteries of the type generally employed in connection with automobiles or other motor-propelled vehicles and is directed to the provision of an improved pillar post structure including improved means for securing the post to the jar cover.

Generally stated, the invention consists of the novel construction and combinations of parts hereinafter described and defined in the claim.

In batteries of the type above referred to, it is customary to secure the pillar posts to the cover by pouring or casting an asphalt compound or the like, in the joint between the two, but the union thus made has not been strong and the result has been that leakage of the acid solution from the battery jar, through the loosened joint, would corrode the pillar post, thus making bad electrical connections. Those familiar with the art well know that it is only by frequent and persistent scraping of the terminal pillar posts that operative contacts can be maintained between the same and the battery leads.

My invention provides means for very positively securing the pillar posts to the cover so that they cannot possibly become loose, and for sealing the joints so that there can be no leakage of the battery fluid and, hence, no corrosion of the posts.

In the accompanying drawings, which illustrate the invention, like characters indicate like parts throughout the several views.

Referring to the drawings:

Fig. 1 is an elevation with some parts broken away and with some parts sectioned on the line 1—1 of Fig. 2, showing a battery equipped with my invention;

Fig. 2 is a plan view of the battery, some parts being broken away; and

Fig. 3 is a vertical section on the line 1—2—3 of Fig. 2, some parts being broken away and said parts being shown on a larger scale than in Figs. 1 and 2.

The numeral 4 indicates the battery jar, the numeral 5 the jar cover, the numeral 6 the battery plate, which parts may be of the usual or any suitable construction. In Fig. 1, the numeral 7 indicates the battery box in which several of the jars will usually be placed.

The numeral 8 indicates the pillar posts shown as cast integral with plate straps 9, to which the battery plates 6 are connected in the customary way.

The jar cover 5 is provided with the customary pockets or depressions $5^a$, through which the pillar posts 8 are passed upward. As an important feature of this invention, the pillar posts 8 are formed with threads $8^a$, with which annular clamping nuts 10 engage. The clamping nuts 10 are of such size that they are spaced from the interiors of the respective pockets $5^a$, so as to leave space for a sealing material such as an asphalt compound $y$. Said nuts 10 are provided with outstanding annular flanges 11 that clamp against the top of the cover and, as shown, are provided with lugs 12 adapting the nuts to be turned by a suitable wrench. The sealing material $y$ will be poured into the cups $5^a$ and the nuts 10 will be screwed down tight, while said sealing material is still in plastic condition. The character $y^1$ indicates sealing material between the cover and jar.

As shown, the cover 5 has the customary filling neck 13 normally closed by a cap 14. The numeral 15 indicates a coupling bar of the usual construction, extended between intermediate pillar posts of the battery. The numeral 16 indicates a washer preferably of soft lead but possibly of rubber placed around the pillar post and clamped between the plate strap 9 and the bottom of the co-operating cup $5^a$.

With the above construction, as is evident, the nut 10—11, when tightened, very rigidly clamps the pillar post to the jar cover and prevents any such movement thereof as would tend to open up the joint that is tightly sealed by the material $y$. Hence, there is no liability of leakage with resulting corrosion and there is no danger of the joint being opened up or being made leaky, even when the pillar posts are roughly handled, as they frequently are, in coupling battery terminals thereto.

The jar 4 and its cover 5, as usual, will preferably be of rubber. The pillar posts, plate straps and clamping nuts are preferably of lead or an alloy consisting chiefly of lead.

In the drawings, I have illustrated the preferred embodiment of my invention, but it will, of course, be understood that said invention is capable of modification and that it is my desire to herein broadly claim the same.

The upper or outer ends of the pillar posts are smooth and tapered, so that they are adapted to make the usual connection with the customary battery lead terminals.

What I claim is:

In a battery, the combination with a cover having a post-receiving pocket with an inwardly projecting annular flange at its lower extremity, of a pillar post extended through said pocket in close contact with the annular bottom flange thereof and provided with threads spaced from the walls of said pocket, a nut working on the threaded portion of said pillar post, said nut having an outstanding flange that engages the top of said cover and having a sleeve-like portion extended into said pocket and spaced from the walls thereof and terminating above the bottom of said pockets, and plastic sealing material filling the space between said pocket and the sleeve portion of said nut and directly engaging with threads of said pillar post.

In testimony whereof I affix my signature.

PAUL GOLDSBOROUGH.